(12) United States Patent
Capoferi et al.

(10) Patent No.: US 6,595,175 B1
(45) Date of Patent: Jul. 22, 2003

(54) CARBURETOR SPACER

(76) Inventors: Thomas D. Capoferi, 57250 New Haven Rd., New Haven, MI (US) 48048; Fred L. Capoferi, 11125 Erdmann, Sterling Heights, MI (US) 48314

( * ) Notice: Subject to any disclaimer, the term of this patent is extended or adjusted under 35 U.S.C. 154(b) by 0 days.

(21) Appl. No.: 10/241,465

(22) Filed: Sep. 12, 2002

(51) Int. Cl.⁷ .............................................. F02M 29/00
(52) U.S. Cl. .................... 123/184.46; 123/590
(58) Field of Search ................. 123/184.46, 184.39, 123/590; 48/189.4

(56) References Cited

U.S. PATENT DOCUMENTS

| | | | | |
|---|---|---|---|---|
| 4,015,574 A | * | 4/1977 | Hanff | 123/590 |
| 4,215,663 A | * | 8/1980 | Gaylord | 123/590 |
| 4,355,623 A | * | 10/1982 | Graham | 123/590 |
| 4,409,951 A | * | 10/1983 | Whitworthl | 123/590 |
| 4,415,507 A | * | 11/1983 | Voliva | 123/184.46 |
| 4,532,909 A | * | 8/1985 | Jackson | 123/590 |
| 4,628,890 A | * | 12/1986 | Freeman | 123/590 |
| D332,612 S | | 1/1993 | Klus | |
| 5,601,059 A | * | 2/1997 | White et al. | 123/590 |
| 5,619,960 A | | 4/1997 | Funk | |
| 6,170,460 B1 | | 1/2001 | Buswell et al. | |

OTHER PUBLICATIONS

Wilson Manifolds, "Tapered Spacers", Brochure (copy).
Wilson Manifolds, "Tapered 4 Hole Spacer 2", website printout, www. Wilson Manifolds. com.

* cited by examiner

Primary Examiner—Marguerite McMahon
(74) Attorney, Agent, or Firm—Hall, Priddy, Myers & Vande Sande

(57) ABSTRACT

A carburetor spacer for installation between a carburetor and an intake manifold which effects increased horsepower in engine operation. More specifically, this invention relates to a carburetor spacer having a particular shape such that improved air/fuel flow to the intake manifold is achieved.

12 Claims, 4 Drawing Sheets

CARBURETOR SPACER

FIELD OF INVENTION

This invention relates to a carburetor spacer for installation between a carburetor and an intake manifold which effects increased horsepower in engine operation. More specifically, this invention relates to a carburetor spacer having a particular shape such that improved air/fuel flow to the intake manifold is achieved.

BACKGROUND OF INVENTION

Spacers for use between the carburetor and intake manifold of an automobile engine are well known in the art and conventionally serve the purpose(s) of increasing horsepower, gas mileage, or torque, as well as reducing emissions in some cases. The spacers (a.k.a. carburetor spacers) are often designed with specific thickness in mind depending on the desired performance enhancement. In particular, the space which is created between the carburetor and the intake manifold allows the air/fuel mixture which is discharged from the carburetor barrel(s) to increase in velocity prior to entering the combustion chamber of an engine. In addition, in certain designs of carburetor spacers, better air/fuel mixing is believed to be achieved. As a result, improved fuel combustion is normally realized.

In certain applications, such as in some automobile racing circuits, increases in horsepower are desired with little increased cost or weight and while conforming to sometimes restrictive engine modification regulations. In such applications, a carburetor spacer is a cheap, efficient, lightweight, and easy to install option.

For such uses (as well as other uses) various prior art attempts to design effective carburetor spacers have been attempted. For example, U.S. Pat. No. 6,170,460, describes a carburetor spacer which employs channels/grooves in the interior of the air/fuel passageways. In another example, U.S. Pat. No. 5,601,059 describes a spacer in which the air fuel ports extend lengthwise into the opening of the intake manifold. While each of these example designs (as well as others designs known in the art) have met varying success, further increases in combustion efficiency and thus improvement in horsepower are desired.

In view of the above, it is apparent that there exists a need in the art for spacer apparatus which overcomes, mitigates, or solves the above problems in the art. It is a purpose of this invention to fulfill this and other needs in the art which will become more apparent to the skilled artisan once given the following disclosure.

SUMMARY OF THE INVENTION

Generally speaking, this invention fulfills the above-described needs in the art by providing: a spacer apparatus for installation between an intake manifold and a carburetor, the spacer apparatus comprising:

a substantially planar spacer body having a top surface and a bottom surface each surface having horizontal portions, the horizontal portion of the bottom surface comprising an intake manifold mounting surface;

an elongated nose member having a base portion and a tip portion, the nose member extending substantially perpendicularly from the approximate center of the bottom surface and the tip member extending a pre-selected distance through a plane of the intake manifold mounting surface;

a plurality of air/fuel passageways located proximal the base portion of the nose member;

mount means for mounting the spacer apparatus and the carburetor to the intake manifold.

In further embodiments, this invention provides: an automotive engine having an air/fuel delivery system comprising in combination:

a carburetor mounted on an intake manifold, the intake manifold having a single plane open plenum;

a spacer apparatus mounted between the carburetor and the intake manifold, the spacer apparatus comprising:

a substantially planar spacer body having a top surface and a bottom surface each surface having horizontal portions, the horizontal portion of the bottom surface comprising an intake manifold mounting surface;

an elongated nose member having a base portion and a tip portion, the nose member extending substantially perpendicularly from the approximate center of the bottom surface and the tip member extending a pre-selected distance through a plane of the intake manifold mounting surface;

a plurality of air/fuel passageways located proximal the base portion of the nose member;

mount means for mounting the spacer apparatus and the carburetor to the intake manifold;

wherein the elongated nose member extends at least partially into the single plane open plenum so as to displace air volume therein.

DETAILED DESCRIPTION OF CERTAIN EMBODIMENTS

Figure 1:
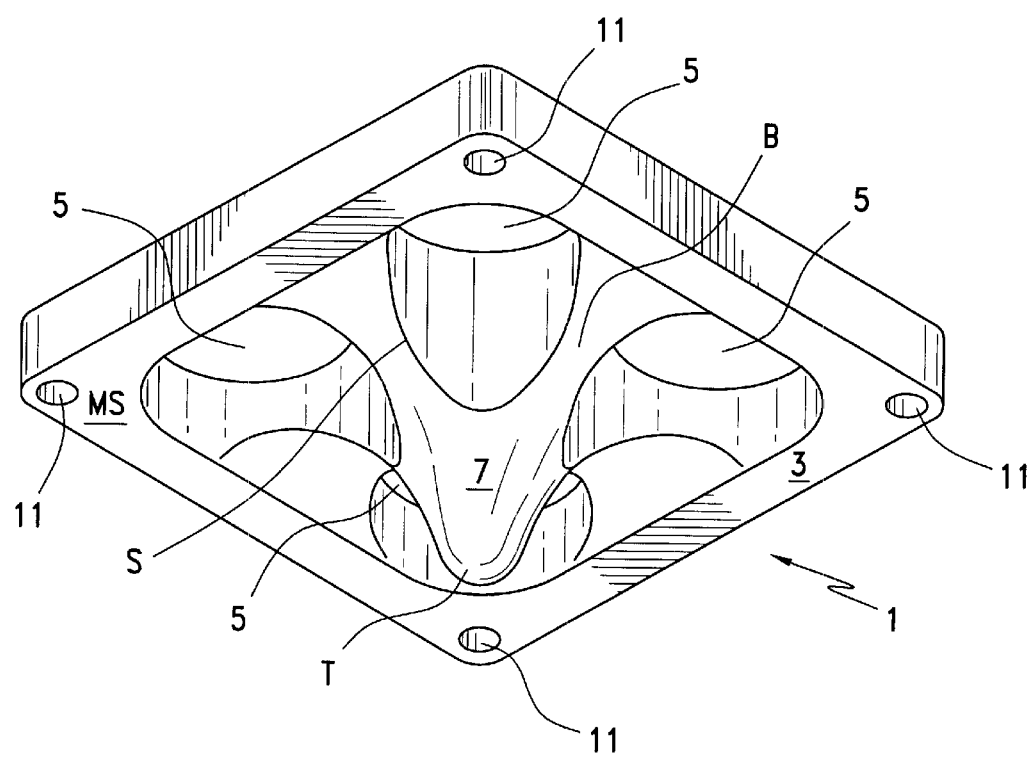
FIG. 1 is a three-dimensional view of one embodiment of the spacer apparatus according to the subject invention
Figure 2:
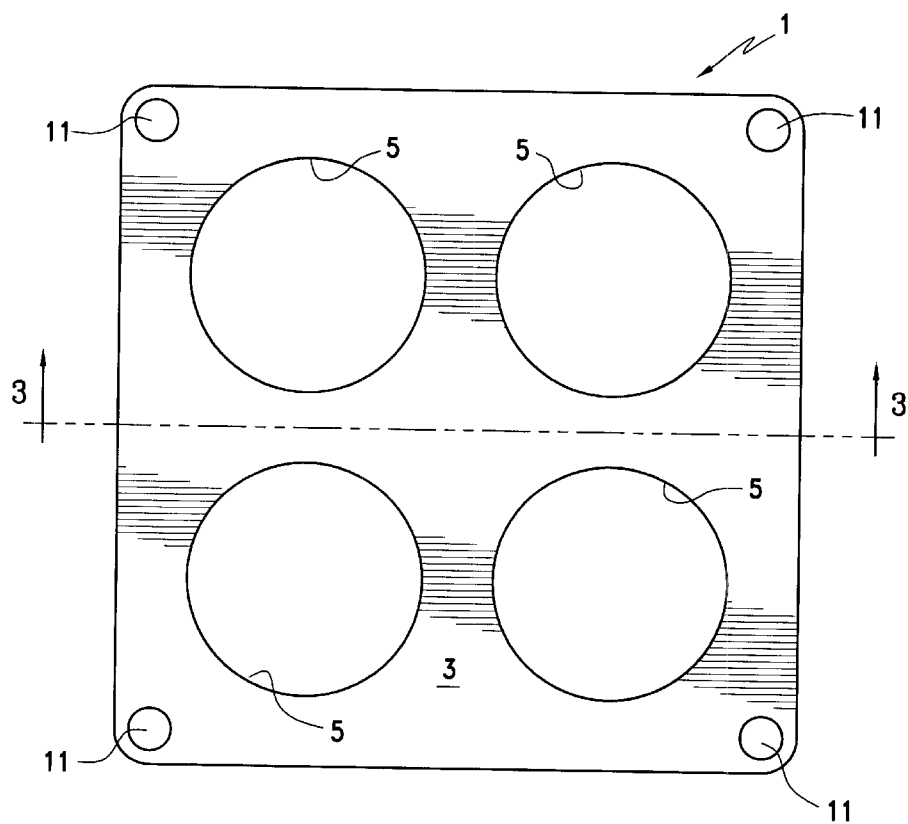
FIG. 2 is a top plan view of the embodiment illustrated in FIG. 1.
Figure 3:
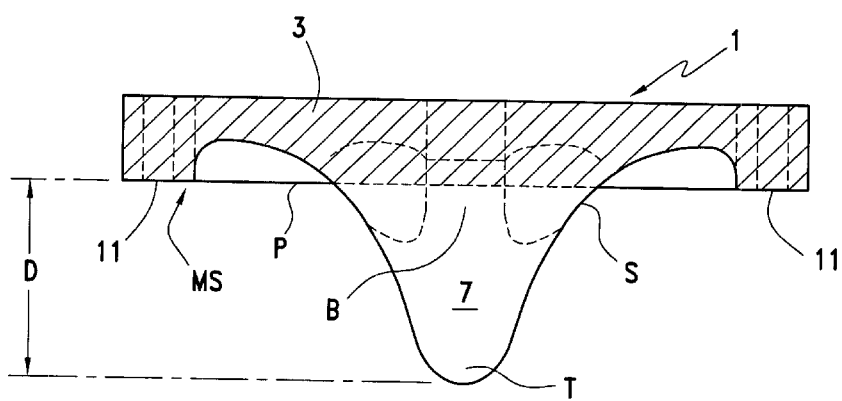
FIG. 3 is a side plan view of the embodiment of the spacer apparatus illustrated in FIG. 2 with certain parts shown in x-ray.

Referring initially to FIGS. 1–3, therein is illustrated one exemplar embodiment of the spacer apparatus 1 according to the subject invention. As may be seen from the illustrations, spacer apparatus 1 comprises a substantially planar body 3 having an approximately square profile which is shaped to match the mounting surfaces of a carburetor and an intake manifold on its top and bottom surfaces respectively. Spacer apparatus 1 further includes a series of 4 air/fuel ports 5 which are arranged/spaced to align with the correspondingly spaced carburetor barrels of a conventional four-barrel carburetor. As such, ports 5 are normally located proximal the corners of body 3 with nose 7 extending substantially equidistant from each port 5 proximal the center of planar body 3. In particular, it is noted that, unlike prior art carburetor spacers, nose 7 extends a pre-selected distance "D" beyond (through) the plane "P" of intake manifold mounting surface "MS" (see FIG. 3) and thus into the plenum of an intake manifold when mounted thereon. In contrast, some prior art spacers have a cone-shaped area located central to the air/fuel ports which does not extend beyond the profile of the apparatus i.e. the area does not protrude past the plane of the intake manifold mounting surface and thus not into an intake manifold plenum (when installed).

More particularly, nose 7 has an initial diameter at its base "B" which decreases or tapers to a second diameter at its tip "T". Although the diameter of base "B" is shown in the figures as being approximately twice as large as the diameter at tip "T", many other size (diameter) relationships can be employed as well as even a reverse taper i.e. a nose in which tip "T" has a larger diameter than base "B". Following the slope of base "B" in the opposite direction (towards body 3), the base of nose 7 slopes as a curvilinear cut (i.e. scallop "S") which terminates at the interior walls of body 3. Each of these designs, as such (including the selection of distance "D"), is capable of providing varying degrees of increased horsepower (depending on the design employed) and thus may be optimized through routine experimentation according to the description provided herein.

Figure 4:
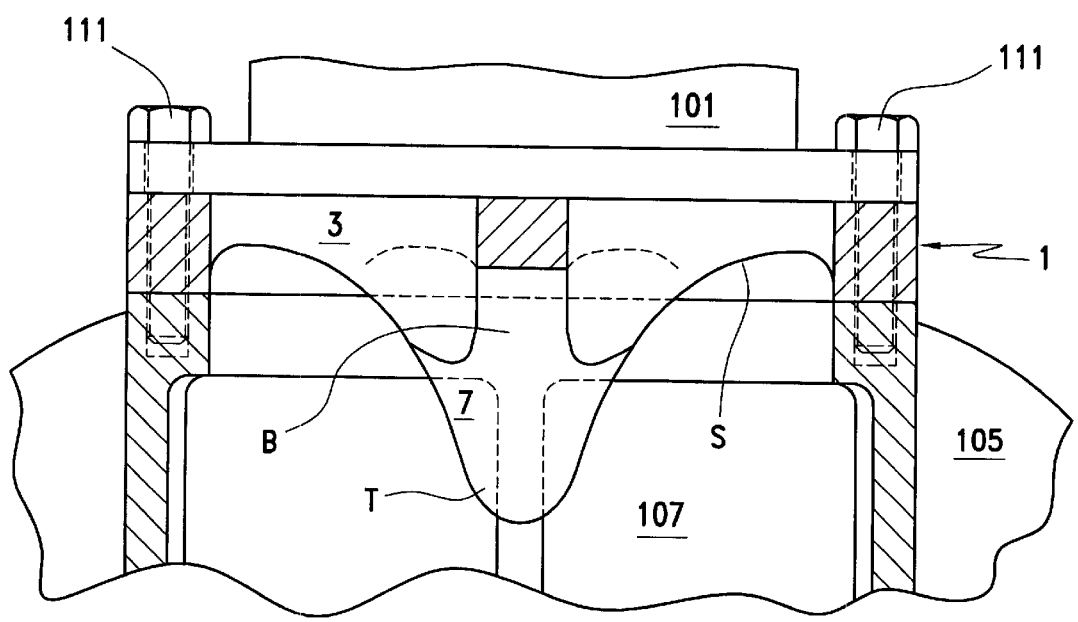
FIG. 4 is a side plan view of one embodiment of the spacer apparatus according to the subject invention shown installed between a conventional carburetor and intake manifold with certain parts shown in x-ray.
Figure 5:
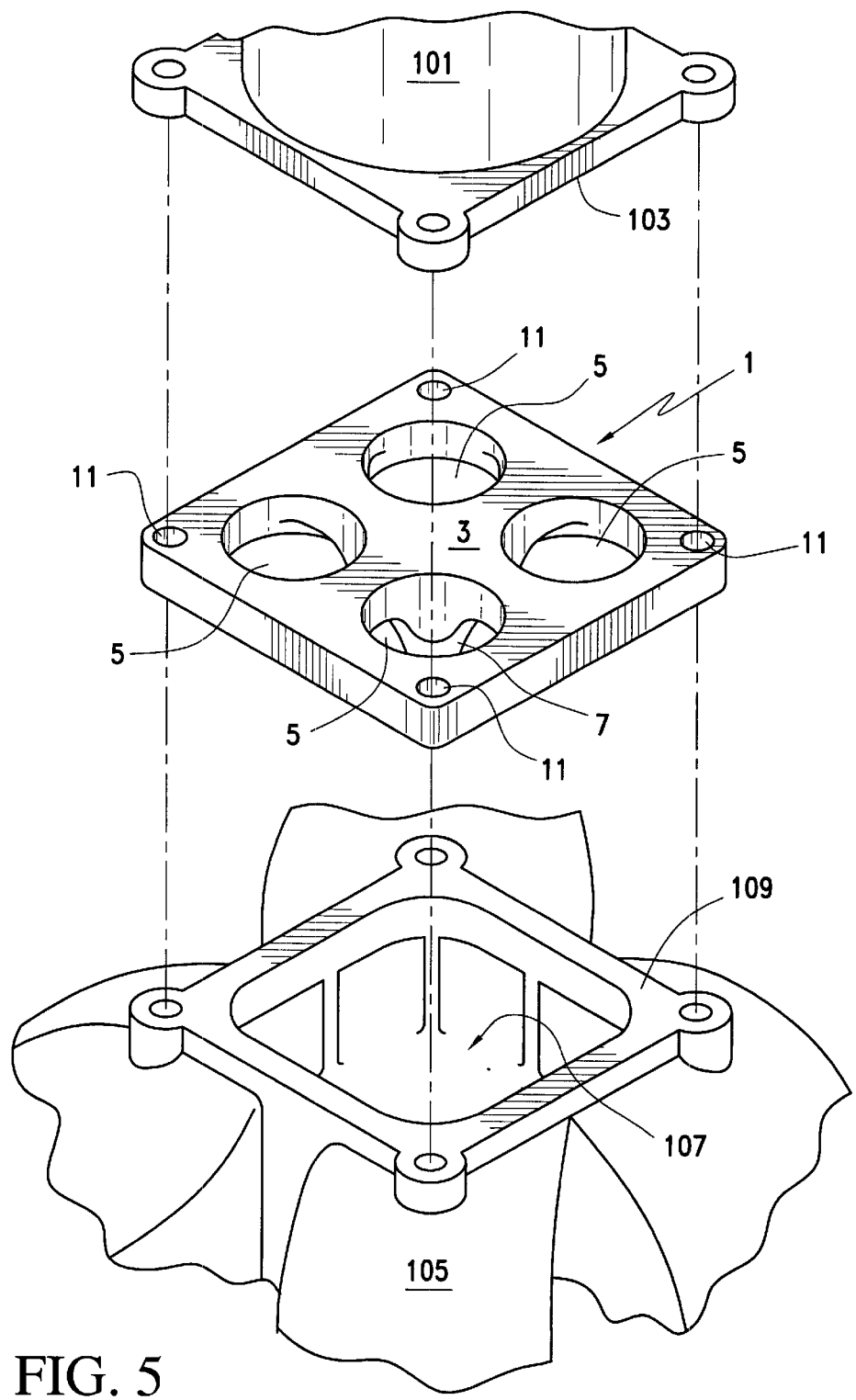
FIG. 5 is a three-dimensional view of a conventional carburetor and a spacer apparatus according to FIG. 1 shown aligned for installation on an intake manifold.

Turning now to FIGS. 4 and 5, spacer apparatus 1 is shown installed with a carburetor 101 on an intake manifold 105 of an internal combustion engine (not shown) via bolts 111. As can be seen more clearly in FIG. 5, carburetor 101 and intake manifold 105 each have mounting surfaces 103 and 109, respectively, each sized and shaped to match the mounting surfaces of spacer apparatus 1. Thus, in order to install spacer apparatus 1, bolt holes 11 are simply matched with the respective bolt holes of carburetor 101 and manifold 105 and bolts 111 are thereafter inserted and threaded thereinto. When installed, as best seen in FIG. 4, nose 7 extends several inches into the approximate center of intake manifold plenum 107 (a single plane open type plenum) thus displacing volume therewithin.

Although the specific mechanism by which the instant invention generates additional horsepower is not concretely known several theories have been promulgated by the inventors which are most clearly understood when accompanied by a brief description of carburetor operation.

In a conventional carburetor, there is normally at least one hour glass shaped barrel (there are four barrels in illustrated carburetor 101) having a top portion with a high pressure environment and a bottom portion having a low pressure environment. Joining the high and low pressure areas (top and bottom areas) is a constriction at which a fuel jet is normally located (drawing fuel from the carburetor bowl). More particularly, when an automobile piston is on its downward stroke (not shown), a low-pressure area, commonly referred to as a "signal", is created which travels through the runners of intake manifold 105 and into plenum 107. Once the "signal" reaches the plenum, it is conventionally distributed between the various barrels thus creating the low pressure areas at the bottom portions of the barrels hourglass construction. Now, because there is a pressure differential between the top and bottom portions of the barrels, air begins to accelerate towards the bottom portion of the hourglass, where it first enters the constriction separating the top and bottom portions. As the air enters and passes through the constriction, the constrictions decreased diameter causes an increase in velocity of the air while the low pressure within the constriction simultaneously draws fuel from the jet and into the air stream. This air/fuel mixture next enters the bottom portion of the barrel (where it is further mixed) and continues through the plenum and to the various combustion chambers.

It is well known in the art that increasing the amount of air/fuel mixture which reaches the combustion chambers of an engine increases horsepower as well as torque. In this regard, the inventors have discovered a way in which air/fuel delivery (to the combustion chambers) may be increased by magnifying the low-pressure area at the bottom portion of the carburetor barrel. More particularly, when employing nose 7 on a carburetor spacer as described above (such that it extends into the intake manifold plenum), nose 7 is thought to direct the low-pressure "signal" (created by the downward stroke of a piston) to the carburetor barrels in a manner previously unknown in the art. Specifically, the slope of the taper of nose 7 is believed to "focus" the low-pressure area at the bottom portion of the carburetor barrel thus creating a greater pressure differential between the bottom and top of the carburetor barrel. In another related theory, it is believed that because nose 7 effectively divides (or occupies) the intake manifold plenum and thus the "signal" (into an area better approximating the size of the runners), that the signal is correspondingly preserved (e.g. kept strong) i.e. not diffused across the volume of the intake manifold plenum. Adding to the effectiveness of nose 7, scalloped surface "S" increases signal focusing ability and thus the ability to achieve the high pressure differentials necessary for increased air/fuel flow.

Although scalloped (curvilinear) surface "S" aids in achieving increased horsepower by "signal" direction additional to that achieved by nose 7, scalloped surface "S" is not required to practice the invention. In particular, nose 7 alone is sufficient for signal direction/preservation and thus increased air/fuel delivery.

Once given the above disclosure, many other features, modifications, and improvements will become apparent to the skilled artisan. Such other features, modifications, and improvements are therefore considered to be a part of this invention, the scope of which is to be determined by the following claims:

We claim:

1. A spacer apparatus for installation between an intake manifold and a carburetor, said spacer apparatus comprising:
    a substantially planar spacer body having a top surface and a bottom surface each said surface having horizontal portions, said horizontal portion of said bottom surface comprising an intake manifold mounting surface;
    an elongated nose member having a base portion and a tip portion, said nose member extending substantially perpendicularly from the approximate center of said bottom surface and said tip member extending a preselected distance through a plane of said intake manifold mounting surface;
    a plurality of air/fuel passageways located proximal said base portion of said nose member;
    mount means for mounting said spacer apparatus and said carburetor to said intake manifold.

2. The spacer apparatus according to claim 1 wherein said nose member further comprises a tip member, said tip member having a larger diameter than said base member and wherein said nose member is substantially rounded throughout the length of said nose member from said base member to said tip member.

3. The spacer apparatus according to claim 1 wherein said nose member further comprises a tip member, said tip member having a smaller diameter than said base member and wherein said nose member is substantially rounded throughout the length of said nose member from said base member to said tip member.

4. The spacer apparatus according to claim 3 wherein said bottom surface of said spacer body includes a wall located interiorly offset from the outer circumference of said spacer body, wherein said wall has a wall surface extending from said horizontal portion of said bottom surface and wherein a portion of said base member extends curvilinearly from an area of said wall surface located a distance offset from the location of said horizontal portion of said bottom surface.

5. The spacer apparatus according to claim 4 wherein said spacer body comprises four sides having approximately equal lengths, and wherein said spacer apparatus includes four air/fuel passageways.

6. The spacer apparatus according to claim 5 wherein each of said four air/fuel passageways is located proximal a corner of said spacer body, and wherein said base member has four base portions extending curvilinearly from said nose portion to said wall and terminating at a location a vertical distance offset from the location of said horizontal portion of said bottom surface.

7. An automotive engine having an air/fuel delivery system comprising in combination:

a carburetor mounted on an intake manifold, said intake manifold having a single plane open plenum;

a spacer apparatus mounted between said carburetor and said intake manifold, said spacer apparatus comprising:

a substantially planar spacer body having a top surface and a bottom surface each said surface having horizontal portions, said horizontal portion of said bottom surface comprising an intake manifold mounting surface;

an elongated nose member having a base portion and a tip portion, said nose member extending substantially perpendicularly from the approximate center of said bottom surface and said tip member extending a preselected distance through a plane of said intake manifold mounting surface a plurality of air/fuel passageways located proximal said base portion of said nose member;

mount means for mounting said spacer apparatus and said carburetor to said intake manifold;

wherein said elongated nose member extends at least partially into said single plane open plenum so as to displace air volume therein.

8. The combination of claim 7 wherein said nose member of said spacer apparatus further comprises a tip member, said tip member having a smaller diameter than said base member and wherein said nose member is substantially rounded throughout the length of said nose member from said base member to said tip member.

9. The combination of claim 8 wherein said bottom surface of said spacer body includes a wall located interiorly offset from the outer circumference of said spacer body, wherein said wall has a wall surface extending from said horizontal portion of said bottom surface and wherein a portion of said base member extends curvilinearly from an area of said wall surface located a distance offset from the location of said horizontal portion of said bottom surface.

10. The combination of claim 9 wherein said spacer body comprises four sides having approximately equal lengths, and wherein said spacer apparatus includes four air/fuel passageways.

11. The combination of claim 10 wherein said carburetor includes a carburetor barrel and wherein during engine operation, said nose member focuses and magnifies a low pressure signal to said carburetor barrel.

12. The combination of claim 7 wherein said nose member of said spacer apparatus further comprises a tip member, said tip member having a larger diameter than said base member and wherein said nose member is substantially rounded throughout the length of said nose member from said base member to said tip member.

* * * * *